Aug. 1, 1944.  D. M. MACKENZIE  2,354,821
STARTING GATE
Filed Jan. 21, 1941  2 Sheets-Sheet 1

Inventor
Donald M. Mackenzie
By Lyon & Lyon
Attorneys

Aug. 1, 1944.   D. M. MACKENZIE   2,354,821
STARTING GATE
Filed Jan. 21, 1941   2 Sheets-Sheet 2

Inventor
Donald M. Mackenzie
By Lyon & Lyon
Attorneys

Patented Aug. 1, 1944

2,354,821

UNITED STATES PATENT OFFICE 2,354,821

STARTING GATE

Donald M. Mackenzie, Vancouver, British Columbia, Canada, assignor to Magnetic Control Gate, Inc., Arcadia, Calif., a corporation of California Application January 21, 1941, Serial No. 375,240

11 Claims. (Cl. 119—15.5)

This invention relates to starting gates and more particularly to the rear gate structure for such a "gate," and which gate is so constructed as to constitute a positive barrier when closed and still permit easy opening when necessary to permit the horses to enter through the gate from the rear thereof.

In starting gates, particularly as used for starting horse races, it is desirable to have the gates formed of the individual stall type in order to protect the horses during the starting of the race from injury due to interference from other horses or from contact with the gate structure. In gates of this type it is desirable to have each stall equipped not only with a front or starting gate from which the horses "break" but also with a rear gate permitting the horses to be led into their stalls. In stall gates of this type it is essential that the rear gates be so formed as to prevent the horses from backing out during the period of time required to line the horses for the start. It is desirable that the stalls be relatively short so that space does not permit the horses or their jockeys to lie back and attempt a running start by attempting to time the moment of the start. In starting gates of this type accidents have occurred resulting in injury to both jockeys, horses and assistant starters due to "rearing," kicking or backing of horses into latched gates and the release of the latches, opening of the gates, or impact of the horses with gate structures resulting in gates opening. In addition to injuries thus caused, backing out of horses from the gates results in delay of the start of the race and results many times in the horse or horses becoming so fractious as to prevent a fair start being accomplished.

It is therefore an object of this invention to provide a rear gate structure for a starting gate which when closed provides a positive barrier for the rear of a stall but which permits easy and quick opening of the stall from the rear if for any reason desired or required.

Another object of this invention is to provide a rear gate structure for the stalls of a stall starting gate which includes an overcenter hinge construction preventing opening of the said rear gate due to pressure or impact from within the stall but which is so constructed as to permit release of the overcenter hinge connection easily and quickly when it is desired or required that the gate be opened.

Other objects and advantages of this invention it is believed will be apparent from the hereinafter set forth description of a preferred embodiment of my invention as illustrated in the accompanying drawings.

Figure 1:
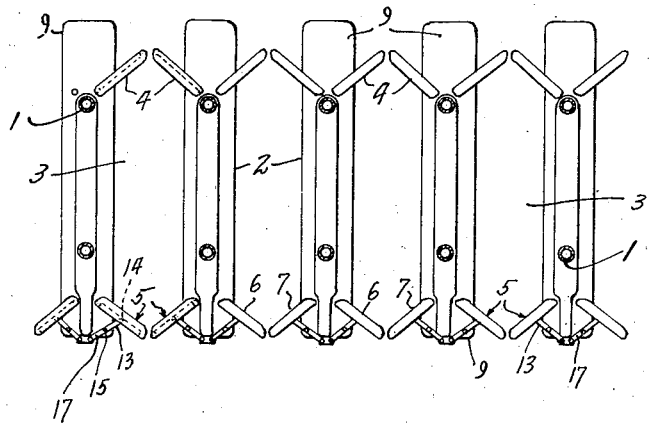
Figure 1 is a top plan view diagrammatic in character with the upper frame structure removed.

In the preferred embodiment of my invention as shown in the accompanying drawings, I have illustrated my invention as applied to a stall starting gate of the multiple stall type, the number of which stalls is determined by the number of horses to be raced.

This stall gate includes a frame structure 1 of any suitable form, which is usually mounted upon some form of mobile support permitting the gate to be transported to the different positions where the races are to be started.

The frame structure includes a plurality of partitions or side members 2 which divide the same into individual stalls 3. The fronts of the stalls are closed by starting gates 4 of any suitable type which are opened to start the race. The rears of the stalls are closed by the rear gates 5 which are preferably of the double door type, including doors or gate members 6 and 7. The doors or gate members 6 and 7 may be of any suitable form of construction and are preferably padded as indicated at 8 in order to protect the horses from injury.

Figure 2:
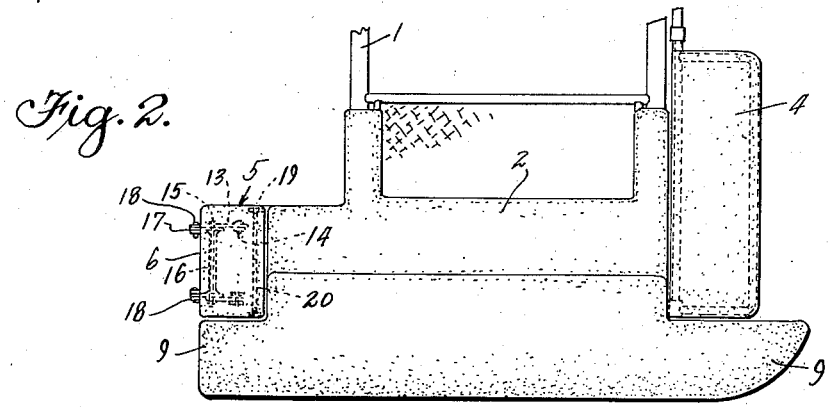
Figure 2 is a side elevation of a single stall of the gate structure.
Figure 3:
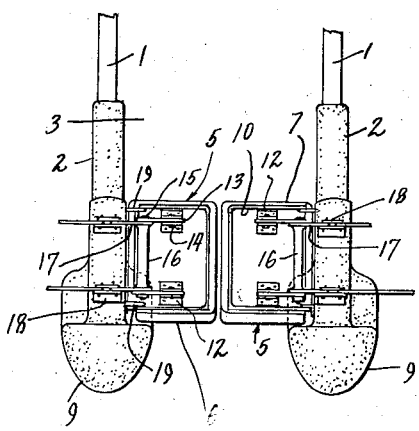
Figure 3 is a rear elevation of a single stall of the gate illustrated in Figure 1.
Figure 4:
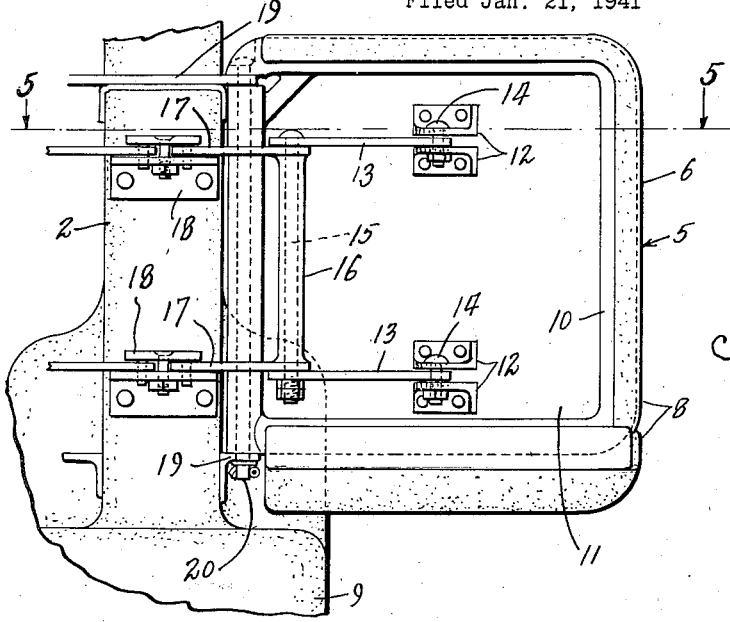
Figure 4 is an enlarge rear elevation of the rear gate and hinge supporting structure.

As illustrated in Figure 2, the stall sections are elongated by providing the elongated sides 9 which extend forwardly and rearwardly from the partition 2 or side member to define the individual stalls which may be padded, as indicated.

The rear doors are swung from the inside of the side members 2 and provide rear barriers to prevent the horses from backing out of the stalls, and are supported so they may be easily swung open to admit the horses to the stalls or to permit access to the stalls when desired after the horses are in position.

In order that the rear doors 6 and 7 may form positive barriers at the rear of the stalls, the means for supporting the said doors is of overcenter or toggle construction which prevents their opening due to pressure or impact from within the stalls.

Each door 6 and 7 may be formed of a suitable pipe frame 10 to which a plate 11 is secured on the stall side. The padding 8 is secured over this plate on the stall side. Secured to the plate 11 are suitable hinge brackets 12 within which the vertically spaced links 13 are pivotally mounted on fixed pins or pivots 14. The brackets 12 may be spaced substantially midway of the gates.

The links are pivotally connected by an intermediate pivot pin 15 which passes through a handle sleeve 16 to spaced links 17. The links 17 are secured in any suitable manner to the handle sleeve 16 at its opposed ends. The links 17 are at their opposite ends pivotally secured by fixed pivots to brackets 18 mounted in the side members 2.

The doors or gate members 6 and 7 are pivotally supported at their inner sides on pivotal brackets 19, and fixed pivots or hinge pins 20 from the inside of the side members 2.

Figure 5:
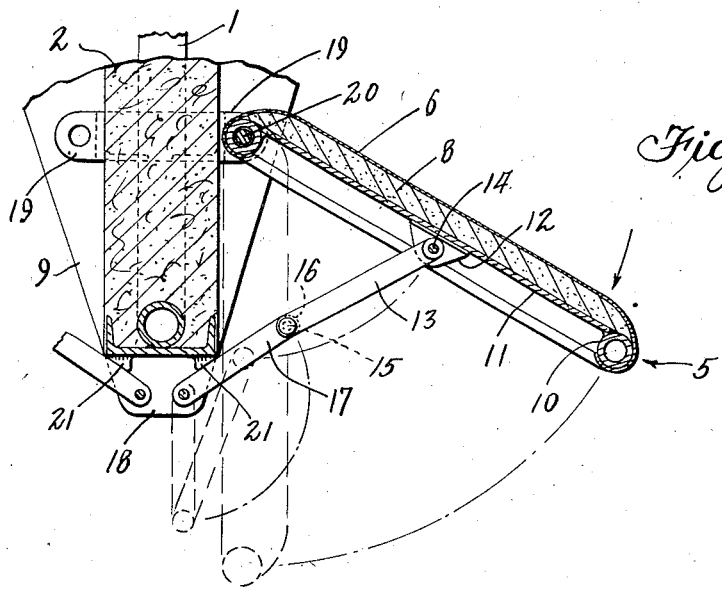
Figure 5 is an enlarged plan section of the gate indicated on line 5—5 of Figure 4.

The positioning of the hinge pins 20, links 13 and 17, and position of the brackets 18 are proportioned in such manner that the axis of the intermediate pin 15 is out of alignment with a straight line drawn through the axis of the pivots connecting the links 13 and 17 to the gate members 6 or 7 and the side members 2 when said gate members are in closed position. This off-center movement of the intermediate pin 15, with the gate members in the closed position as shown in Figure 5, provides that with pressure exerted on the inside of either gate member 6 or 7, the direction of force transmitted through the links 13 is so directed as to maintain a solid metal to metal brace when the movement of the links 17 is arrested by engagement with the brackets 18 as indicated at 21 in Figure 5. The brackets 18 in this instance provide limit stops for the over-center movement of the links 17 and pin 15.

As the pin 15 is limited to a slight travel over-center, it is apparent that even with a great force against the inner face of either gate member 6 or 7, the gate member may be easily opened manually from the outside of the stall by gripping the handle sleeve 16 and exerting an outward force to again swing the pin 15 over-center.

The gate members 6 and 7 are preferably arranged to form a rearwardly extending V when in their closed position. It will be noted that the fixed pivot on the bracket 18 for the link 17 of the over-center locking or toggle means is disposed rearwardly of the hinge pin or fixed pivot 20 and that the fixed pivot 14 on the gate members 6 and 7 is located at a point intermediate the width of said gate members. The arrangement of the various pivots is such that the distance between the pins 20 of the gate members associated with any given stall is less than the distance between the pivots connecting the links 17 with the brackets 18. It will also be noted that the distance from the pivot of the link 17 along a line passing through the axis of said pivot and normal to the plane of the gate member 6 or 7 when the gate member is in closed position is greater than the distance along a line passing through said axis and normal to the plane of the gate member 6 or 7 when the gate member is in its open position. This relationship will be evident from Figure 5 in which the gate member 6 is shown in its closed position by full lines and in its open position by dotted lines. It will still further be noted that the links 13 and 17 comprising the toggle or over-center locking means are disposed substantially in the plane of the partition member 2 when the gate member 6 is in its wide open position.

The solid gate construction and location of the pin 15 prevent a horse from kicking the gate open when within the stall.

Having fully described my invention and a preferred embodiment thereof, it is to be understood that my invention is not limited by the specific illustration given but is of the full scope of the appended claims.

I claim:

1. In a barrier for a starting gate for races and wherein animals are maintained in starting position by side walls and front and rear gates: a pair of side members spaced apart to define a stall; a gate member associated with each of said side members and cooperable to form a closure for one end of said stall, each gate member having a fixed pivot supporting the same on its associated side member; a fixed pivot on each gate member at an intermediate position in the width thereof; a fixed pivot on each of said side members; toggle means operatively interconnecting the second-named pivots with the third-named pivots, the first-named pivots being a shorter distance from each other than the third-named pivots; and stop means operatively associated with said toggle means for preventing inadvertent movement of said gate members from closed to open position.

2. A stall type starting gate for races, including: a side member constituting one side of a stall; a fixed pivot on said side member; a gate member mounted upon said fixed pivot; a second fixed pivot on said side member disposed outwardly of said first fixed pivot; a third fixed pivot on the outer side of said gate member; toggle means operatively interconnecting said second and third fixed pivots; and stop means on one of said members engageable by and cooperable with said toggle means when said gate member is in its closed position for preventing movement of said gate member to its open position by pressure acting against the inner side of said gate member.

3. A starting gate as defined in claim 2, in which the stop means is on the side member.

4. A starting gate as defined in claim 2, in which the toggle means is manually operable by means disposed intermediate the second and third fixed pivots.

5. A starting gate as defined in claim 2, in which the toggle means includes a pivot intermediate the second and third pivots and in which said toggle means is adapted to be manually moved substantially into the plane of the side member when said gate member is in its wide open position.

6. A starting gate as defined in claim 2, in which the toggle means includes an intermediate pivot and in which the stop means is arranged to limit movement of the toggle means to a position in which the intermediate and second and third pivots are substantially in alignment.

7. A starting gate for races, including: a pair of side members spaced apart to define a stall; a fixed pivot on the inner side of each of said side members; a gate member mounted upon each of said fixed pivots, said gate members forming a closure for one end of said stall; a second fixed pivot on the outer side of each of said gate members; a third fixed pivot on each of said side members disposed outwardly of the first-named fixed pivots; separate toggle means interconnecting said second fixed pivots with said third fixed pivots; and stop means on one of the members asssociated with each toggle means and being out of alignment with a line drawn through the axis of said second and third fixed pivots for limiting movement of said toggle means to a position wherein said toggle means prevents inadvertent movement of said gate members from their closed position.

8. A starting gate for races, including: a pair of side members spaced apart to define a stall; a first fixed pivot on the inner side of one of said side members; a gate member mounted upon said first fixed pivot; a second fixed pivot on said gate member; a third fixed pivot on said one side member; toggle means operatively interconnecting said second and third fixed pivots, the distance from the third fixed pivot along a line passing through the axis of said third fixed pivot and normal to the plane of said gate member when said gate member is in closed position being greater than the distance along a line passing through the axis of said third fixed pivot and normal to the plane of said gate member when said gate member is in open position; and stop means operatively associated with said toggle means for limiting the manual movement of said toggle means to a position wherein said toggle means prevents movement of said gate member from its closed position.

9. A starting gate for horse races, including: a pair of side members spaced apart to define a stall; a pair of gate members associated with said side members and forming a closure for the rear end of said stall; means hingedly supporting a gate member upon each of said side members for movement about a vertical axis, said gate members being arranged to form a rearwardly extending V when in their closed position; and over-center locking means for maintaining said gate members in closed position against a force acting on the inner side of said gate members tending to move said gate members to open position, said over-center locking means comprising a pair of links between each side member and the associated gate member, one end of one link of each of said pair of links being pivotally connected with a gate member and one end of the other link of each of said pairs of links being pivotally connected with a side member at a point rearwardly of the hinged connection of the gate member with its associated side member, means pivotally interconnecting the other ends of the respective pairs of links, and stop means limiting the inward movement of said pairs of links to a position in which the axis of the pivotal interconnection of the links of each pair of links is disposed slightly inwardly of a straight line passing through the axis of the pivotal connections of the links with said gate members and side members.

10. A starting gate for horse races, including: a pair of side members spaced apart to define a stall; a pair of gate members associated with said side members and forming a closure for the rear end of said stall; means hingedly supporting a gate member upon each of said side members for movement about a vertical axis, said gate members being arranged to form a rearwardly extending V when in their closed position; and over-center locking means for maintaining said gate members in closed position against a force acting on the inner side of said gate members tending to move said gate members to open position, said over-center locking means including horizontally disposed links pivotally connected to the gate members at one end, horizontally disposed links pivotally connected to the side members at one end at a point disposed rearwardly of the hinged connection of said gate members with the side members, intermediate pivot means interconnecting said links at their adjacent ends, and stop means arranged to be engaged by one of the interconnected links of each gate member to limit the pivoting of the links about their intermediate pivot to a position in which the axis of the intermediate pivot is disposed slightly inwardly of a straight line passing through the axis of the pivotal connecttions of the links with the gate members and side members; and a handle sleeve in which each intermediate pivot is journaled.

11. A starting gate for horse races, including: a pair of side members spaced apart to define a stall; a pair of gate members associated with said side members and forming a closure for the rear end of said stall; means hingedly supporting a gate member upon each of said side members for movement about a vertical axis, said gate members being arranged to form a rearwardly extending V when in their closed position; and over-center locking means for maintaining each of said gate members in closed position against a force acting on the inner side of said gate members tending to move said gate members to open position, said over-center locking means comprising vertically spaced links pivotally connected at one end with a gate member, vertically spaced links pivotally connected at one end with the side member associated with the gate member, the pivotal connection of said second-mentioned links being disposed rearwardly of the hinged connection of the gate member relative to its associated side member, an elongated intermediate pivot interconnecting the adjacent ends of said first and second-mentioned links, a handle sleeve surrounding said intermediate pivot, and means limiting the inward movement of said links to a position in which the axis of the intermediate pivot is disposed slightly inwardly of a straight line passing through the axis of the pivotal connections of the first-mentioned links with the gate member and the axis of the pivotal connections of the second-mentioned links with the associated side member.

DONALD M. MACKENZIE.